United States Patent [19]

Greenblatt et al.

[11] Patent Number: 4,526,092
[45] Date of Patent: Jul. 2, 1985

[54] ADJUSTABLE POWERED NUTCRACKER

[76] Inventors: Abraham J. Greenblatt, 6722 Waggoner Dr., Dallas, Tex. 75230; Joon S. Kim, 6873 Winchester, Dallas, Tex. 75231

[21] Appl. No.: 588,125

[22] Filed: Mar. 9, 1984

[51] Int. Cl.³ .............................................. A23N 5/00
[52] U.S. Cl. ...................................... 99/575; 99/579; 99/580; 99/618
[58] Field of Search .......................... 99/568, 571–573, 99/574–576, 577, 578, 579, 581–583, 617, 618, 619–621, 622, 625, 628; 426/481–483; D7/50, 98; 30/120.1, 120.2

[56] References Cited

U.S. PATENT DOCUMENTS

| | | | |
|---|---|---|---|
| 1,606,226 | 11/1926 | Hopkins et al. | 99/575 |
| 2,144,841 | 1/1939 | Glaser | 99/574 |
| 4,034,665 | 7/1977 | McFarland et al. | 99/574 |
| 4,350,088 | 9/1982 | Rubio, Jr. | 99/574 X |
| 4,448,115 | 5/1984 | Volk, Sr. | 99/574 |

Primary Examiner—Timothy F. Simone
Attorney, Agent, or Firm—Hubbard, Thurman, Turner & Tucker

[57] ABSTRACT

A nutcracking apparatus comprising a motor driven rotary roller type cracker member with longitudinal serrations or teeth which engages a nut and forcibly cracks the shell between the roller member and a stationary cracking member comprising a plurality of spaced apart cracking plates having a series of serrations or teeth formed thereon along a curved path. The stationary cracking member is mounted on a support member which is slidable on a bearing member within the apparatus housing and is adjustably positioned by an actuating screw. The adjustable support member includes a gauging jaw mounted thereon which is cooperable with a second gauging jaw mounted on the apparatus housing for gauging the overall dimension of a shell-enclosed nut. Adjustment of the gauging jaws to gauge the overall outer dimension of the nut simultaneously adjusts the width of a space between the cracking members so that for each nut gauged an optimum distance between the cracking members is provided to crack and crush the nut shell without damaging the kernel. The cracking members and drive mechanism therefor are enclosed in a housing having a hood portion with a top opening door for inserting nuts to be cracked into the space between the cracking members. A removable cracked nut receiving hopper is mounted in the housing and engages a normally open switch to prevent energization of the drive motor when the hopper has been removed from the housing.

13 Claims, 6 Drawing Figures

ADJUSTABLE POWERED NUTCRACKER

BACKGROUND OF THE INVENTION

1. Field of the Invention

The present invention pertains to a motor operated nutcracker having a rotary cracker roller member cooperable with a stationary serrated cracker plate to crack the shells of nuts and other shell enclosed kernels. The stationary cracker plate is adjustable to vary the gap between the cracker members and the stationary cracker member is connected to one jaw of a nut gauging device for selecting the proper gap between the cracker members.

2. Background

Various types of power operated nutcracking apparatus are known which utilize two or more rotating cracker members which form a gap for receiving shell enclosed nuts and other kernels. The podded or shell enclosed articles are fed into a gap formed between the rotating cracker members to be engaged by serrations or teeth on the cracker members to forcibly crack the shells. Although it is known to provide for selectively positioning one of the roller-type cracker members relative to the other, the accurate gauging of the proper gap for cracking nuts of various dimensions is difficult to carry out with conventional nutcrackers and renders these devices relatively ineffective for cracking various sizes and types of edible nuts.

Known types of powered nutcrackers utilizing opposed rotating cracker members also are not particularly effective for cracking nuts of various sizes in that the nut is not forcibly engaged between the rotating members in a manner which provides for complete cracking or breakup of the shell sufficiently to make the kernels or nut meat easy to remove. The path length of engagement of the nut shell provided by opposed rotary-type cracker members is not sufficient to assure proper breakup and separation of the shell from the kernel.

In addition to the above-mentioned problems in the art of powered nutcracker devices, there are several improvements which have been needed to provide a nutcracker which may be particularly adapted for use in the home as a domestic appliance for cracking various types of nuts, as well as for use in commercial nutcracking operations. The specific problems in the art of nutcrackers mentioned above as well as the provision of several other desired features in the art of nutcrackers has been accomplished by the present invention.

SUMMARY OF THE INVENTION

The present invention provides an adjustable powered nutcracker utilizing a pair of opposed cracker members which form a gap of pre-selected width for receiving various types and sizes of shell enclosed nuts and other shell enclosed kernels for forcibly cracking or breaking up the shell to permit removal of the nut or kernel without damaging the kernel itself.

In accordance with an important aspect of the present invention there is provided a powered nutcracker having a pair of opposed cracker members, at least one of which is of a rotary type and is motor driven to forcibly roll or propel a shell enclosed nut through a gap formed between the cracker members and wherein the width of the gap has been pre-selected utilizing a gauging mechanism interconnected with one of the cracker members. The gauging mechanism preferably includes a pair of opposed gauging jaws between which a shell enclosed nut is positioned and the jaws are closed into engagement with the nut to gauge the overall dimension of the nut and concomitantly set the width of the gap between the shell cracking members. Accordingly, upon feeding the nut into the apparatus between the opposed cracker members, a predetermined amount of forcible engagement of the shell is accomplished and the shell is broken for easy removal from the enclosed kernel without damaging the kernel itself.

In accordance with another aspect of the present invention, there is provided an improved powered nutcracker having a rotary roller-type cracker member with an improved configuration of longitudinal serrations or teeth, and which roller member is cooperable with a stationary cracker member, also having a plurality of serrations or teeth, for engaging the nut as it is rolled and forcibly squeezed between the rotary cracker member and the stationary cracker member. The stationary cracker member is characterized by a set of spaced apart parallel cracker plates each provided with an improved configuration of serrations or teeth which assure that the nut is forcibly transported between the cracker members with a rolling action to thoroughly break up the outer shell. In accordance with a preferred geometry of the stationary cracker member, the teeth of the stationary cracker plates are disposed along an arcuate line and project generally upwardly into the gap formed between the cracker members to provide forcible engagement with the shell of a nut being traversed through the gap between the cracker members.

In accordance with yet another aspect of the present invention, there is provided a powered nutcracker having an improved nut-loading door with a barrier plate for supporting the nut and allowing the nut to fall between the cracking members only upon closure of the loading door.

In accordance with still a further aspect of the present invention, there is provided a powered nutcracker having a unique, aesthetically pleasing housing, a removeable hopper for receiving the nuts which have been processed by the apparatus and an improved control arrangement whereby the apparatus is inoperable when the nut-receiving hopper has been removed from its normal portion for receiving cracked nuts processed by the apparatus.

Those skilled in the art will further appreciate the above-mentioned advantages and features of the present invention as well as additional superior aspects thereof upon reading the detailed description, which follows, in conjunction with the drawing.

BRIEF DESCRIPTION OF THE DRAWING

FIG. 5 is a detail view showing the geometry of one of the stationary cracker plates; and, FIG. 6 is a schematic diagram of the motor control circuit for the nutcracker of the present invention.

DESCRIPTION OF THE PREFERRED EMBODIMENT

Figure 1:
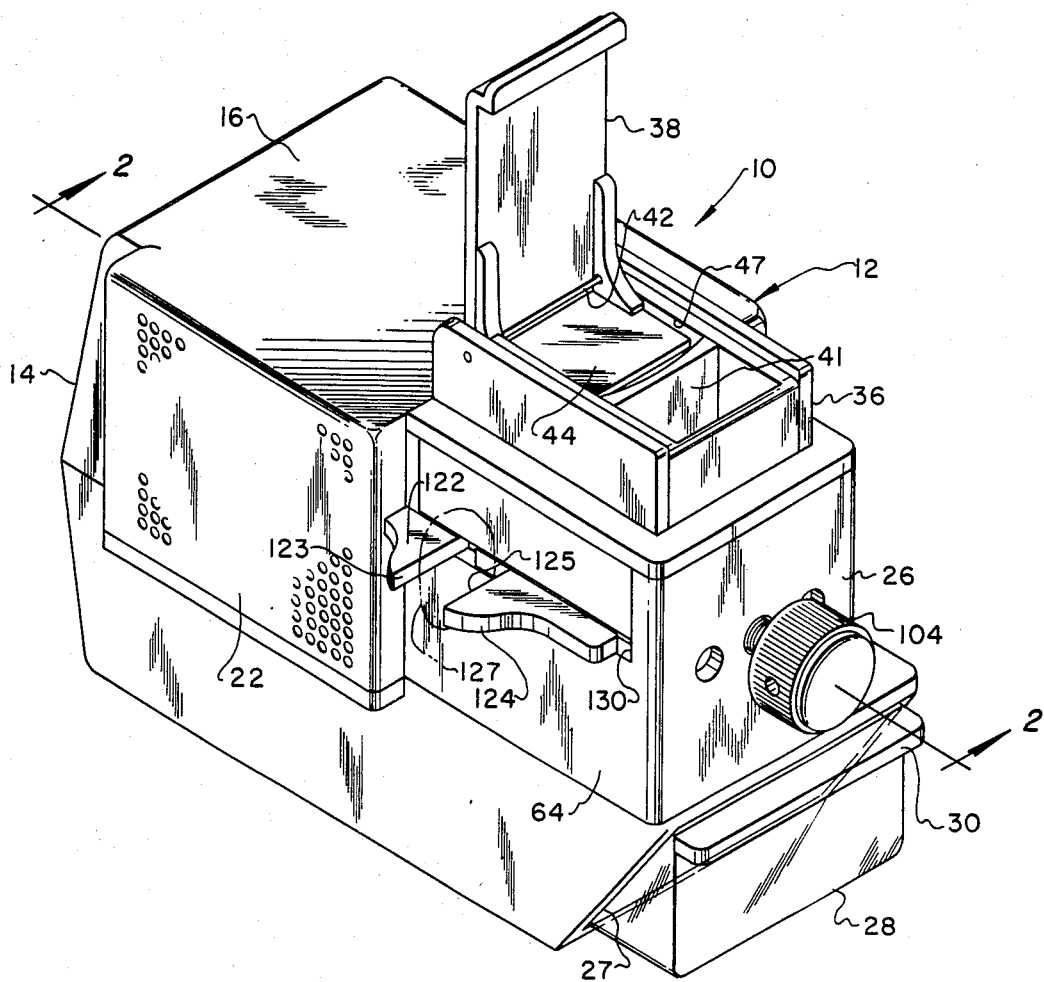
FIG. 1 is a perspective view of the adjustable powered nut cracker of the present invention.

In the description which follows, like parts are marked throughout the specification and drawing with the same reference numerals, respectively. The drawings are generally to scale, although certain features may be shown exaggerated in scale in the interest of clarity.

Referring to FIGS. 1 through 4, the present invention pertains to an apparatus for cracking shell-enclosing kernels, including various types of shell-enclosed nuts, and is particularly adapted for use as a domestic or home appliance, although certain features of the invention may be incorporated into an apparatus for commercial nutcracking equipment. The nutcracking apparatus is generally designated by the numeral 10 and includes a frame or housing 12 having a motor enclosure section 14 including a roof 16 and opposed sidewalls 18 and 20. The sidewall 20 includes a cooling air inlet grille 22 and an endwall 24 of the housing is formed with suitable perforations to form a cooling air outlet grille 25, FIGS. 2 and 3. An endwall 26 opposite the cooling air outlet grille 25 is scarfed at 27 and defines an opening for receiving a removable nut retaining hopper comprising a generally rectangular open-top, pan-shaped element 28 having a handle portion 30 for inserting the hopper within an interior chamber delimited by a bottom wall 32 and an interior partition 33. The housing 12 may be made in one or more sections and, is preferably fabricated of molded plastic. A lower housing section 13, including the hopper receiving chamber, is preferably fabricated separate from an upper section 15, and the opposed sections are suitably secured together to form an enclosure for the working elements of the apparatus 10.

The upper housing section 15 includes a generally rectangular hood section 36 which may be removably mounted on the upper housing section and is provided with a door 38 for closing a passage 40 into the interior of the housing 12. The door 38 is pivotally supported on the hood section 36 by a transverse hinge pin 42 and is movable between a closed position shown by the solid lines of FIGS. 2 and 4 and an open position shown by the solid lines of FIG. 1 and the alternate position lines of FIG. 2. The door 38 includes a nut-supporting barrier plate 44 formed integral with the door and disposed in the passage 40 in the closed position of the door but swingable into a position for supporting a nut thereon and blocking access to the passage 40 in the alternate open position of the door 38, shown in FIGS. 1 and 2. The hood 36 includes an interior depending partition 41, defining in part the passage 40 together with an end wall 43 and opposed sidewalls 45 and 46 of the hood. A top opening 47 is operable to be closed by the door 38 in the position shown in FIG. 2.

Figure 2:
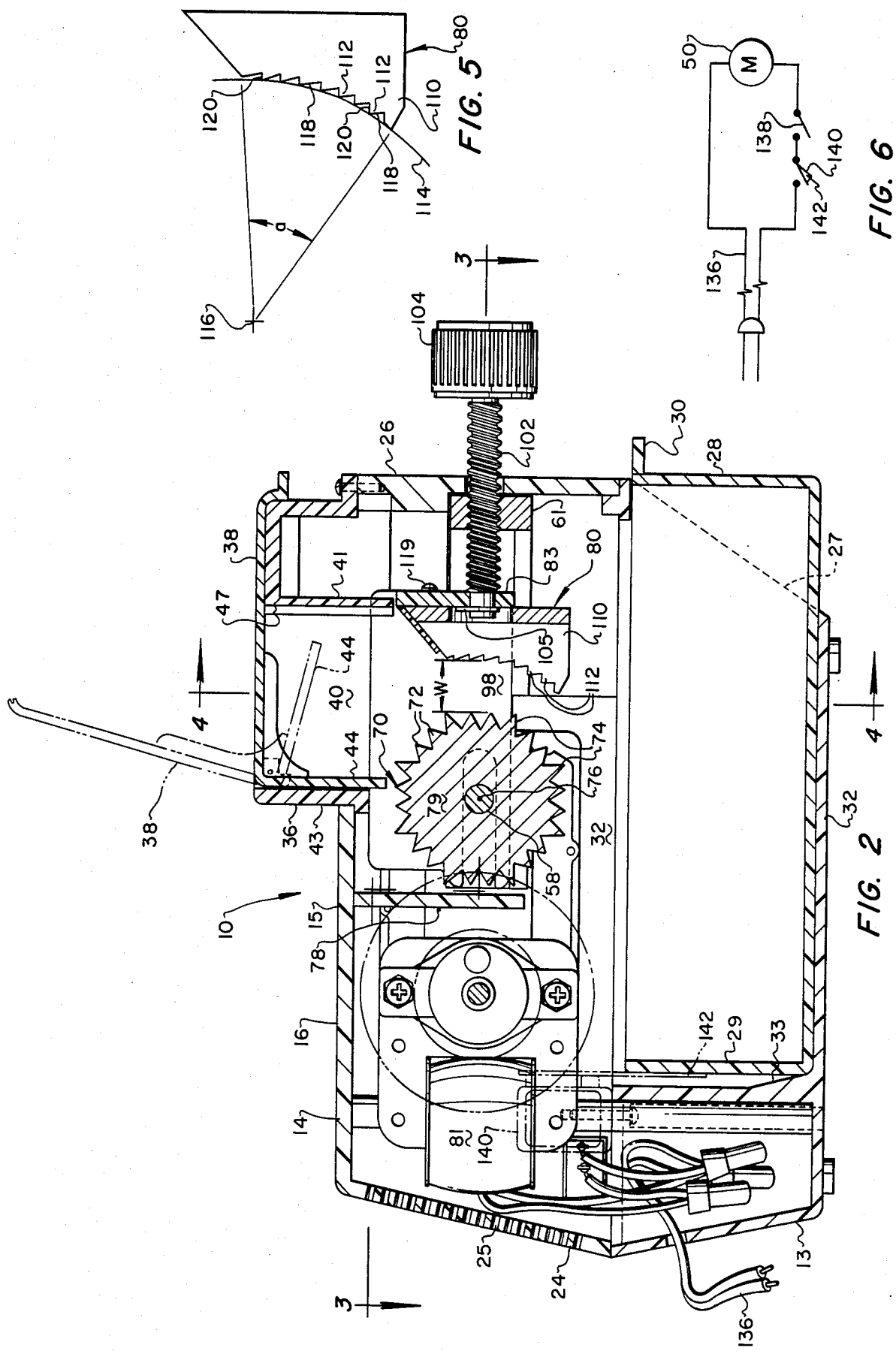
FIG. 2 is a longitudinal section view taken generally along the line 2—2 of FIG. 1.
Figure 3:
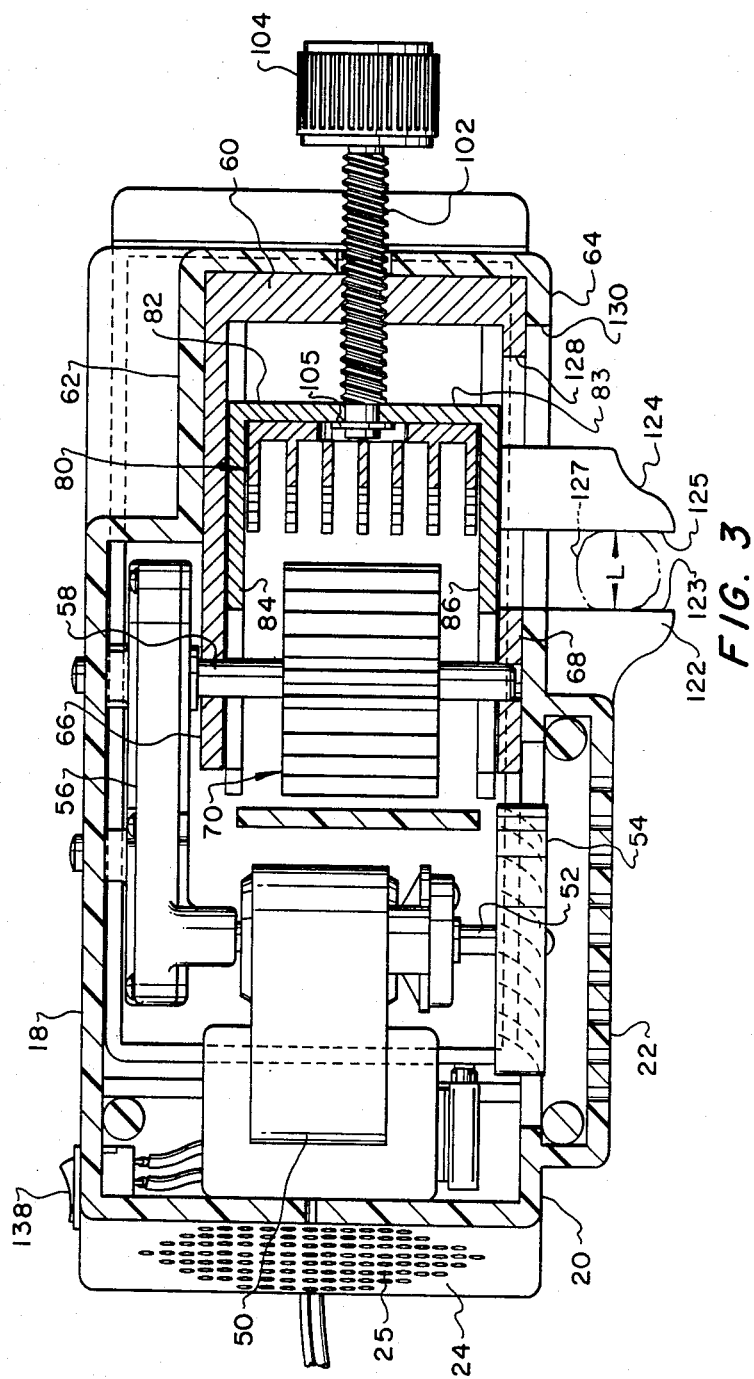
FIG. 3 is a section view taken generally along the line 3—3 of FIG. 2.

Referring primarily to FIGS. 2 and 3, the nutcracker 10 is preferably operated by a fractional horsepower electric induction motor 50 supported within the upper housing section 15 and having a double ended output shaft 52 connected at one end to a shrouded fan 54 and drivably connected at the other end to a speed reduction gear-type power transmission unit 56, also suitably supported in the housing section 15. The transmission unit 56 is preferably of a parallel shaft spur gear-type having a relatively high reduction ratio in the range of 200:1 to 250:1 and includes a power takeoff shaft 58 which is supported at one end by the reduction unit 56 and at the other end by a generally U-shaped bearing support member 60 disposed within the housing section 15. The bearing support member 60 is suitably secured within the housing section between opposed housing sidewall portions 62 and 64 and includes a pair of opposed parallel extending legs 66 and 68.

The power output shaft 58 is drivably connected to a rotary shell cracker member 70, having a somewhat octagonal cross-sectional shape and a plurality of longitudinally extending serrations or teeth 72. The teeth 72 are interposed between at least eight longitudinally extending teeth 74 which are of generally the same configuration as the teeth 72 but having their tips spaced radially from the axis of rotation 76, FIG. 2, slightly greater than the teeth 72 to define the somewhat octagonal cross-sectional profile of the rotary cracker member 70. The cracker member 70 is disposed in a fixed position within the housing 12 and adjacent to a depending partition 78, separating a nutcracking section 79 of the interior of the housing from a portion 81 enclosing the drive motor 50.

The polygonal cross-sectional profile formed by the teeth 72 and 74 provides an improved impacting and squeezing action on a nut shell as compared with a more circular profile for the cracker member.

Figure 4:
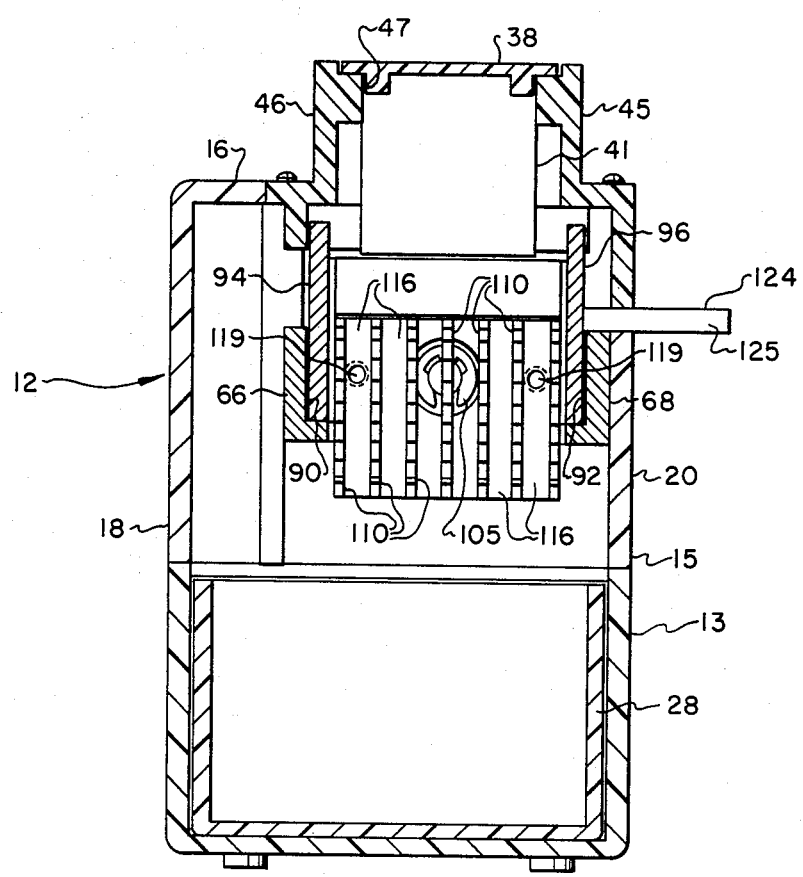
FIG. 4 is a section view taken along the line 4—4 of FIG. 2.

The apparatus 10 includes a second nutcracker member, generally designated by the numeral 80, which is supported on a generally U-shaped support slide 82, having a pair of opposed parallel extending legs 84 and 86 which are slidably supported in bearing ways 90 and 92 formed by the bearing support legs 66 and 68, respectively, as shown in FIG. 4. The legs 84 and 86 each include upwardly projecting sideboard portions 94 and 96, FIG. 4, to assist in containing a nut which has been inserted into the passage 40 and dropped into a gap or space 98 formed between the cracker members 70 and 80.

The cracker member 80 is adapted to be selectively positioned with respect to the cracker member 70, to vary the width of the gap or space 98 to provide for cracking shell-enclosed nuts having shells of varying outer dimensions. The support member 82 is suitably connected to an actuator comprising elongated screw 102 which projects through an opening in the endwall 26 of the housing section 15 and is provided with a rotary operating knob 104. The screw 102 is threadedly engaged with the stationary bearing member 60, projects through the base portion 61, is secured to a base portion 83 of the support member 82 and is so constructed as to be rotatable relative thereto. The screw 102 is connected to the member 82 by a suitable retaining ring 105, FIGS. 3 and 4. Accordingly, the screw 102 is rotatable relative to the support member 82 and is operable to axially advance and retract to adjust the position of the cracker member 80 relative to the cracker member 70.

Referring to FIGS. 2 and 4, in particular, the cracker member 80 is characterized by a plurality of spaced apart vertically extending cracker plates 110, each of which is provided with a plurality of serrations or teeth 112, see FIG. 5 also, which are arranged to have their tips disposed along an arcuate line 114, having a radius center at 116 and corresponding to the axis 76 in at least one position of the cracker member 80 relative to the rotary cracker member 70. The plates 110 are spaced apart sufficiently to provide intervening channels 116. The cracker member 80 is preferably secured to the support member 82 by suitable fasteners 119, FIGS. 2 and 4.

As shown in FIG. 5, the arrangement of the teeth 112 is such that the teeth extend along an arcuate path having an included angle a of about 45 degrees. The teeth 112 each include a relief surface 118 which for essentially all of the teeth project in planes extending generally vertically upward or within approximately 20 degrees of the vertical, and the teeth include rake surfaces 120 which project in a generally horizontal or near horizontal direction. Accordingly, the teeth project in a generally upward direction and operably engage a nut as it enters the space 98 between the cracker members 70 and 80 and is carried around in a somewhat arcuate path as the cracker member 70 essentially rolls the nut over the teeth 112.

Referring particularly to FIGS. 1 and 3, the nutcracking apparatus 10 includes a unique gauging mechanism for determining the overall outer dimension of a shell of a nut to be cracked between the cracker members 70 and 80. The gauging mechanism includes a pair of opposed gauging jaws 122 and 124. The jaws 122 and 124 include opposed parallel gauge surfaces 123 and 125, respectively, between which a nut 127 may be disposed and sized by adjusting the position of the jaw 124 relative to the jaw 122. The jaw 122 is fixed to the housing 12 and projects from the sidewall 64, as shown in FIGS. 1 and 3. The jaw 124 is secured to and projects laterally from the leg 86 of the support member 82 through respective slots 128 and 130 formed in the leg 68 of bearing member 60 and the housing sidewall 64. The linear distance L, FIG. 3, between the jaw surfaces 123 and 125 corresponds to the linear distance between the teeth 72 and the teeth 112, minus a predetermined amount corresponding somewhat to the average thickness of typical edible nuts, such as Brazil nuts, filberts, hickory nuts, almonds, pecans, and walnuts. Accordingly, by placing a selected nut such as the nut 127 between the jaws 122 and 124 and moving the support member 80 by way of the screw 102 until the surfaces 123 and 125 engage the nut to determine the dimension L, the cracker member 80 has been simultaneously placed in relationship to the cracker member 70 so that the width W of the space 98 corresponds to the dimension measured on the nut 127, minus a predetermined amount corresponding somewhat to an average shell thickness. Those skilled in the art will appreciated that the nut cracking apparatus 10 may be therefore adjusted to crack a nut of any selected size by prior gauging of the nut before it is deposited in the apparatus and forcibly rolled between the members 70 and 80 to crack and crush its shell.

The apparatus 10 includes a suitable power cord or cable 13 including a suitable plug, not shown, for connecting the apparatus to a source of electric power such as a typical household electric circuit. The conductors enclosed within the power cord 136 are suitably interconnected with a manually actuated on/off switch 138, FIG. 3, and a switch 140, FIG. 2, mounted within the interior of the housing section 15. The switch 140 includes an actuating level 142 which in engagable with an end wall 29 of the hopper 28 when the hopper is disposed in the housing section 13 in its working position. The switch 140 is a normally open switch and is closed when the lever 142 has been engaged by the hopper end wall 29 when the hopper 28 is in its normal position to receive nuts which have been propelled through the space 98. If the hopper 28 is removed from the housing 12, the switch 140 moves to an open position to prevent energization of the motor 50. Accordingly, the switches 138 and 140 are arranged in a series relationship, see FIG. 6, so that the motor 50 may not be energized unless both switches 138 and 140 are in their closed positions.

The apparatus 10 is placed in operation by gauging the outer dimension of a nut to be cracked by placing the nut such as the nut 127 between the gauging jaws 122 and 124 and rotating the screw 102 until the jaws are moved to a position wherein the gauging surfaces 123 and 125 are in engagement with the outer surface of the shell of the nut. This step, of course, correctly sets the width W of the space 98 between the cracking members 70 and 80. The door 38 is then opened to the position illustrated by the alternate position lines in FIG. 2, and the nut 127 is placed on the barrier plate 44. The motor 50 may then be energized to commence rotation of the cracking member 70 followed by closing of the door 38 which allows the nut resting on the plate 44 to be dropped into the space 98 for engagement by the cracking members.

With rotation of the cracking member 70, the teeth 72 and 74 forcibly engage the shell of a nut to crush the shell between the cracking members 70 and 80 and to propel the shell through the somewhat arcuate path formed by the space 98 and defined between the cracking members 70 and 80. As the member 70 rotates, it tends to roll the nut disposed between the cracking members along the teeth 112 so that the shell is fractured in several places and generally disintegrates by the time the nut has moved to a position to be dropped into the interior of the hopper 28. During operation of the motor 50, the fan 54 draws motor cooling air through grille 22 and expels air through grille 25.

With the operation of the apparatus 10 to crack a plurality of nuts, each nut is preferably gauged and the position of the cracking member 80 adjusted prior to placement of the nut on plate 44 to be deposited into the space 98. Accordingly, the cracking members 70 and 80 are suitably adjusted for optimum engagement of each nut and whereby nuts which are too small will not be dispensed through the apparatus without being cracked and nuts which are too large will not cause jamming of the drive mechanism. After a suitable quantity of nuts have been cracked, the hopper 28 may be removed for further handling of the cracked nuts. Once the hopper 28 is removed from the apparatus, the switch 140 opens to prevent energization of the motor 50.

The housing section 13 and 15 and the hopper 28, as well as the support members 60, 82 and the hood 36, may be formed of molded or fabricated plastic. The cracker members 70 and 80 may be fabricated or conventional engineering metals. Although the embodiment of the invention described herein is advantageously arranged to be driven by an electric motor, the apparatus can also be easily modified to be manually operated.

Those skilled in the art will appreciate that a unique nutcracking apparatus is provided by the present invention. Although a preferred embodiment of the apparatus has been described herein, those skilled in the art will appreciate that various substitutions and modifications may be made to the apparatus without departing from the scope and spirit of the invention as recited in the appended claims.

What we claim is:

1. Apparatus for cracking the shells of nuts and like shell enclosed kernels, comprising:
   a frame;
   a pair of shell cracking members mounted spaced apart on said frame, at least one of said cracking members being rotatable relative to said frame for forcibly propelling a nut through a gap formed between said cracking members to crack said shell;
   motor means drivably connected to said one cracking member;
   at least one of said cracking members comprising a movable cracking member being movable relative to said frame and the other cracking member to vary the width of said gap;
   gauge means on said frame comprising a pair of jaws mounted on said apparatus, one of said jaws being mounted stationary relative to and spaced apart from said cracking members and the other of said jaws being operably connected to and spaced apart from said movable cracking member and movable with said movable cracking member to a predetermined position relative to said one jaw and corresponding to the distance between said cracking members for gauging the overall outer width of a nut shell so that a predetermined spacing of said cracking members may be set without placing a nut between said cracking members to set the width of said gap for cracking said shell upon passing said shell between said cracking members; and
   means for moving said movable cracking member and said other jaw simultaneously to set the width of said gap.

2. The apparatus set forth in claim 1 wherein:
   said movable cracking member comprises a toothed plate means mounted on said frame, and said one cracking member comprises a roller mounted for rotation on said frame.

3. The apparatus set forth in claim 2 wherein:
   said toothed plate means includes a plurality of side-by-side, spaced apart plates secured to a base portion, each of said plates having a plurality of spaced apart teeth formed on a generally arcuate line and defining a curved space between said teeth and said roller for cracking a nut shell as said nut is forcibly rolled between said roller and said toothed plate means.

4. The apparatus set forth in claim 2 wherein:
   said toothed plate means is mounted on a support member slidably supported on bearing means on said frame, and said support member is connected to an actuating screw operably interconnected between said support member and said frame for moving said support member and said other jaw in response to rotation of said actuating screw.

5. The apparatus set forth in claim 1 wherein:
   said frame comprises opposed walls forming an enclosed housing, a hood portion of said housing defining an opening in a wall of said hood portion, a movable door forming a closure over said opening, and a nut supporting plate connected to said door and operable to substantially block said opening in an open position of said door and to move with said door to clear said opening upon closure of said door and to discharge a nut toward said gap.

6. The apparatus set forth in claim 1 wherein:
   said frame comprises opposed walls forming a housing for enclosing said motor means and said cracking members, means defining an opening in said housing for receiving a generally pan-shaped nut-receiving hopper in said housing for receiving and holding nuts which have been cracked by said cracking members, and switch means engagable with said hopper to prevent energization of said motor means except when said hopper is disposed in said housing in said position.

7. A powered nutcracker for cracking a variety of different size shell-enclosed nuts, comprising:
   frame means comprising a housing having opposed sidewalls, end walls, and a top wall forming an enclosure, an opening formed in one of said side and end walls for receiving a removable nut receiving hopper;
   means forming a portion of said top wall defining an opening in said housing for inserting a shell-enclosed nut into said apparatus;
   a movable door forming a closure over said opening;
   a first rotatable nut cracking member mounted in said enclosure and drivably connected to means for rotating said first cracking member;
   a second nut cracking member mounted in said enclosure adjacent to said first cracking member and connected to means for moving said second cracking member relative to said first cracking member;
   nut gauging means including a first jaw secured on the exterior of said housing and stationary relative to said first cracking member and a second jaw secured on the exterior of said housing and stationary relative to said second cracking member, said second jaw and said second cracking member being movable relative to said first jaw and said first cracking member to gauge the overall outer dimension of a nut disposed between said jaws and simultaneously set a predetermined spacing between said first and second cracking members for cracking the shell of said nut.

8. The apparatus set forth in claim 7 including:
   a plate member operably connected to said door for movement to cover said opening and support a nut on said plate member when said door is in an open position.

9. The apparatus set forth in claim 7 including:
   a support member for said second cracking member including spaced apart, opposed legs slidably supported in bearing ways formed in said housing for movement of said support member toward and away from said first cracking member and an actuating screw connected to said support members and threadedly engaged with means stationary on said housing.

10. The apparatus set forth in claim 7 wherein:
    said first cracking member comprises a polygonal shaped roller having a plurality of circumferentially spaced, radially projecting teeth formed on the periphery thereof, and said second cracking member includes a plurality of spaced apart side-by-side plates, each of said plates having an array of spaced apart teeth facing toward the teeth on said roller.

11. A powered nutcracker for cracking a variety of different size shell-enclosed nuts, comprising:
    frame means comprising a housing having opposed walls forming an enclosure, an opening formed in one of said walls for receiving a removable nut-receiving hopper;

means forming a portion of one of said walls defining an opening in said housing for inserting a shell-enclosed nut into said apparatus;

a movable door forming a closure over said opening;

motor means operably disposed in said housing;

a first rotatable nut cracking member mounted in said housing and drivably connected to said motor means; and a second nut cracking member mounted adjacent to said first member and connected to means for moving said second member relative to said first member, said second member including a plurality of side-by-side, spaced apart plates secured to a base portion, each of said plates having a plurality of spaced apart teeth formed in part by generally vertically extending relief surfaces, said teeth being formed along a generally arcuate line and defining a curved space between said teeth and said first member for receiving a nut, whereby said nut shell is cracked as said nut is forcibly rolled between said first member and said plates.

12. The apparatus set forth in claim 11 wherein:

said second member is movable relative to said first member to vary the width of said space formed between said member depending on the size of nut shell to be cracked, and in at least one position of said second member relative to said first member the axis of rotation of said first member is substantially coincident with the radius center of said arcuate line.

13. The apparatus set forth in claim 11 wherein:

said second member is mounted on a support member supported in said housing for sliding movement relative to said housing to vary the width of said space, said support member including opposed upstanding sideboards delimiting the length of said space.

* * * * *